D. F. VAUGHAN.
GUARD RAIL CLAMP.
APPLICATION FILED JULY 29, 1911.
1,045,645.
Patented Nov. 26, 1912.
2 SHEETS—SHEET 1.
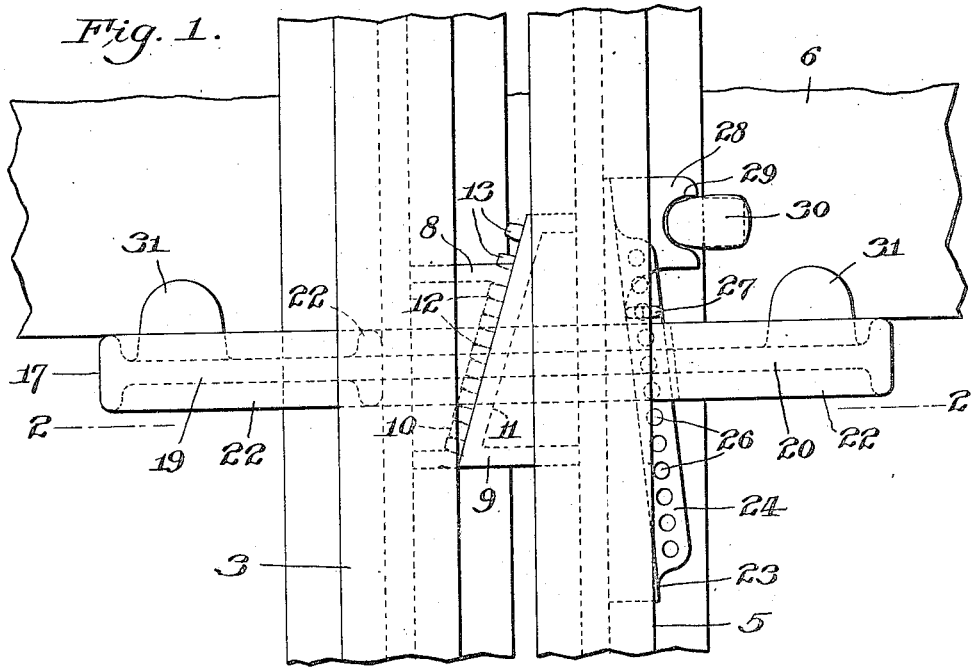
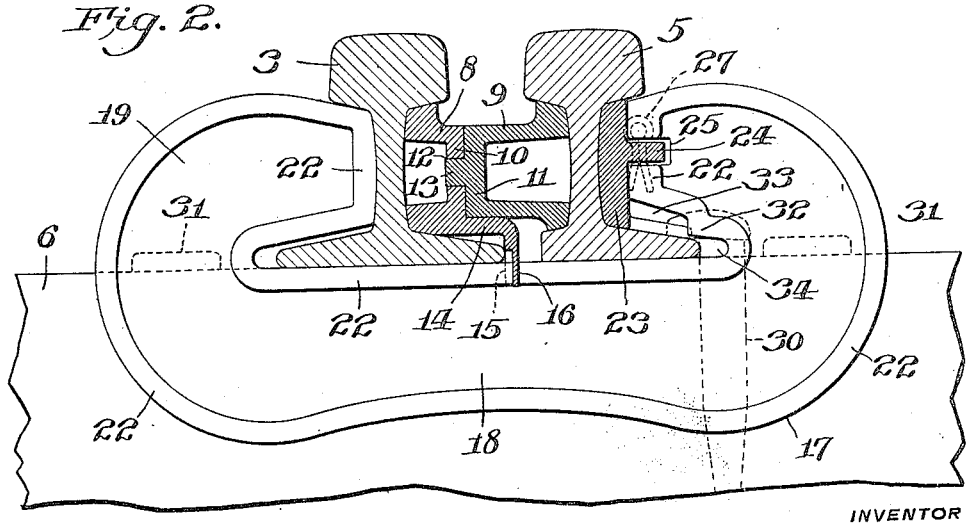
WITNESSES
W. E. Watson
G. P. Sharkey
INVENTOR
David F. Vaughan
BY A. V. Groult
ATTORNEY D. F. VAUGHAN.
GUARD RAIL CLAMP.
APPLICATION FILED JULY 29, 1911.
1,045,645.
Patented Nov. 26, 1912.
2 SHEETS—SHEET 2.
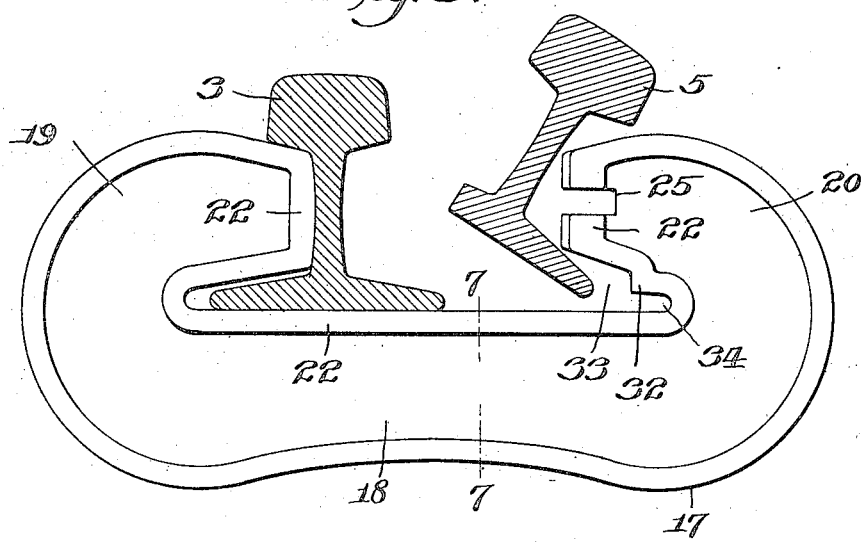
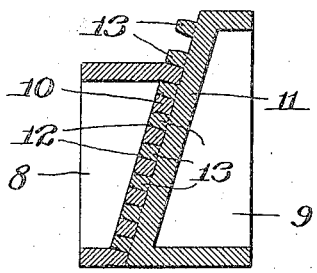
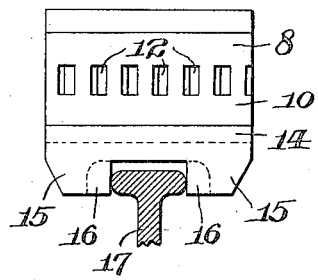
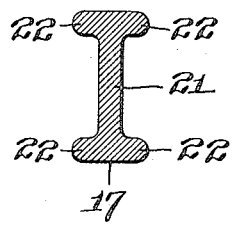
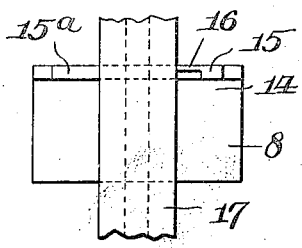
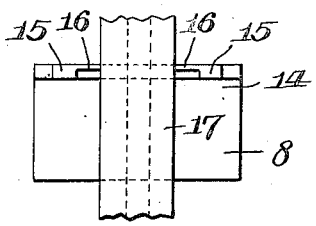
WITNESSES
W. F. Watson
G. O. Shasky
INVENTOR
David F. Vaughan
BY
ATTORNEY

UNITED STATES PATENT OFFICE.

DAVID F. VAUGHAN, OF HADDONFIELD, NEW JERSEY.

GUARD-RAIL CLAMP.

1,045,645.

Specification of Letters Patent.

Patented Nov. 26, 1912.

Application filed July 29, 1911. Serial No. 641,298.

*To all whom it may concern:*

Be it known that I, DAVID F. VAUGHAN, a citizen of the United States, residing at Haddonfield, in the county of Camden and State of New Jersey, have invented certain new and useful Improvements in Guard-Rail Clamps, of which the following is a specification.

This invention relates to railroad guard rail clamps, in which filler blocks are employed for spacing the guard rail from the main rail and in which a yoke embracing the rails is employed and provided with a clamping wedge for clamping the parts together.

In guard rail clamps of this character, one of the filler blocks is provided with depending lugs or stops which embrace the yoke to hold the blocks in place above the same. Frequent failures of these guard rail clamps are due to the depending lugs or stops being broken off by displacing the yoke when the clamping wedge is driven in, thus destroying the means for retaining the filler blocks in place and permitting them to work loose.

One of the objects of my invention is to overcome this defect by providing the filler block with a frangible temporary stop or stops to hold the block in place before the wedge is driven in and by providing the filler block with permanent stops stronger than the frangible stop or stops and arranged outwardly thereof, so that the temporary stops may be set in engagement with the yoke before the wedge is driven in and so that the permanent stops will hold the block in place, should the temporary stop be broken by the displacement of the yoke when the wedge is driven in.

A further object of my invention is to provide the pair of filler blocks with novel engaging means which will not be affected by the accumulation of dirt; a further object of my invention is to provide a novel means for preventing outward movement of the clamping wedge; and a further object of my invention is to provide a strong clamping yoke of novel construction which may be readily applied to rails of different sizes and which will firmly hold the parts in position, all as will be hereinafter fully described and particularly claimed.

In the accompanying drawings, illustrating my invention: Figure 1 is a plan view of a portion of a railroad structure showing a guard rail clamp embodying my invention. Fig. 2 is a vertical section thereof, on line 2—2 of Fig. 1. Fig. 3 is an elevation of the yoke, showing the main rail in section and engaged therewith, and showing the guard rail in section in one of its positions relatively to the yoke while the parts are being assembled. Fig. 4 is a horizontal section through the filler blocks. Fig. 5 is an elevation of one of the filler blocks, showing a part of the yoke in section. Fig. 6 is a bottom view of the filler block shown in Fig. 5 and a portion of the yoke. Fig. 7 is a section through the yoke, on line 7—7 of Fig. 3. Fig. 8 is a bottom view of one of the filler blocks, showing a modified construction.

3 designates the main or track rail, 5 the guard rail arranged parallel and adjacent thereto, and 6 a portion of a cross tie supporting the rails 3 and 5.

Arranged between the rails 3 and 5 is a pair of wedge-shaped separating or filler blocks 8 and 9 having opposing walls 10 and 11, respectively, which are inclined with respect to the rails 3 and 5. The block 8 is fitted to the main rail 3 in a manner to engage the same between the head and base thereof, and the block 9 is fitted to the guard rail 5 in a manner to engage the same between the head and base thereof, as shown.

Formed in the central portion of the inclined wall 10 of the block 8 is a series of spaced openings 12 into which extend correspondingly spaced teeth 13 which project from the inclined wall 11 of the block 9, the teeth 13 being so disposed as to enter the openings 12 when the inclined wall 10 of the block 8 is engaged with the inclined wall 11 of the block 9. The teeth 13 thus serve to prevent vertical and longitudinal movement of the blocks 8 and 9, relatively to each other.

It will thus be seen that by disengaging the teeth 13 from the walls of the openings 12, the blocks 8 and 9 may be adjusted relatively to each other longitudinally of the rails 3 and 5. It will also be seen that by thus adjusting the blocks 8 and 9, their outer portions engaged with the rails 3 and 5 may be adjusted toward or from each other so that when the rails are engaged with the blocks the desired space between the rails will be provided.

The block 8 is provided with a hollow interior which communicates with the openings 12 into which the teeth 13 are inserted, whereby should any dirt accumulate within the openings 12 the dirt will be ejected from the openings and into the hollow block 8 by the teeth 13 as they enter the openings 12 when the blocks 8 and 9 are placed into engagement with each other. The block 8 is provided with an extension 14 having permanent stop parts or flanges 15 projecting downwardly therefrom below the base of the main rail 3 and in spaced relation to each other. The extension 14 is also provided with frangible stop parts or flanges 16 projecting downwardly therefrom below the base of the main rail 3 and in spaced relation to each other. The distance between the stop parts 15 is greater than the distance between the stop parts 16. The stop parts or flanges 16 form continuations of the stop parts or flanges 15, the flanges 16, being much thinner than the flanges 15 so that the flanges 16 may be comparatively easily broken, for a purpose hereinafter explained.

The stop parts 15 and 16 embrace a yoke 17 which extends transversely beneath the rails 3 and 5 and beneath the filler blocks 8 and 9. The yoke 17 is provided with a body portion 18 and upwardly and inwardly extending end portions 19 and 20. This yoke is preferably forged of steel and comprises a vertical web 21 extending through the body portion 18 and end portions 19 and 20, and marginal flanges 22 extending around the web 21, the yoke 17 being in the form of an I-beam in cross section.

The end portion 19 is arranged outwardly of the main rail 3 and it extends between the head and base portion of the main rail and has its marginal flanges 22 bearing against the outer face of the web of the main rail, as shown.

The end portion 20 is arranged outwardly of the guard rail 5 and it extends toward the space between the head and base portion of the guard rail and has its marginal flanges 22 bearing against the outer face of a clamping wedge 23 interposed between the outer face of the web of the guard rail 5 and the end portion 20 of the yoke, whereby when the wedge 23 is driven into place, the rails 3 and 5 and the interposed filler blocks 8 and 9 will be firmly clamped together.

In driving the clamping wedge 23 into position to clamp the parts, it frequently happens that the yoke 17 is slued around or displaced to some extent in the direction that the wedge is being driven. Therefore, the purpose of providing the outer permanent stops 15 and the inner frangible stops 16 is that when the parts are assembled and before the wedge 23 is driven in, the frangible stops 16 will embrace and engage the sides of the yoke 17 to set the filler blocks above the same, and to permit one of the frangible stops 16 to be broken, should the yoke 17 be displaced when the wedge 23 is driven in, thereby leaving the permanent stops 15 intact to prevent the filler blocks 8 and 9 from subsequently working out of place. The purpose of providing the filler block 8 with two frangible stops 16, as shown in Figs. 5 and 6, is to permit the ends of the yoke 17 to be reversed with relation to the filler blocks. It will be readily understood however that it is necessary to have the temporary or frangible stop 16 only on the side of the yoke 17 facing the direction of the point end of the wedge 23. In Fig. 8 of the drawings, I have shown a modification in which a single frangible stop 16 and the permanent stop 15 are provided on one side of the yoke 17 and a single permanent stop 15$^a$ is provided on the other side of the yoke 17.

The wedge 23 is provided on its outer portion with a longitudinally extending rib 24 which extends through an off-set or opening 25 in the adjacent end portion 20 of the yoke 17. The rib 24 is provided with a series of holes 26 extending vertically therethrough which are adapted to receive a cotter pin 27 in different positions of adjustment of the wedge 23, the cotter pin 27 being located to engage the yoke 17 and prevent outward movement of the wedge 23.

The point end of the wedge 23 is provided with a flange 28 directly above the top of the base of the guard rail 3. The flange 28 is provided with a notch 29 exposing the top of the base of the guard rail 5; and driven into the underlying cross-tie 6 is a spike 30 the head of which extends over and engages the top of the base of the guard rail 5 within the notch 29 of the flange 28. It will therefore be understood that the spike 30 not only holds the guard rail 5 down upon the cross-tie 6 by direct engagement therewith, but the spike 30 also engages the wall of the notch 29 and holds the wedge 23 and also the other parts of the guard rail clamp in position adjacent the cross-tie 6.

The yoke 17 is provided with projections 31 which are adapted to rest upon the adjacent cross-tie 6 and assist in supporting and preventing displacement of the rails and parts of the clamp.

The bottom of the end portion 20 of the yoke 17 which extends over the base of the guard rail 5 is provided with a shoulder 32 providing a wide space 33 between the end portion 20 and body portion 18 inwardly of the shoulder 32 and a narrow space 34 between the end portion 20 and body 18 outwardly of the shoulder 32, as clearly shown in the drawings. This construction enables me to bring the inner face of the end portion 20 very close to the web of the adjacent rail and permits the employment of a comparatively thin clamping wedge and increases the safety and durability of the clamp. I am enabled to do this for the reason that the shoulder 32 will form a support for the yoke 17 upon the underlying guard rail base, and that the wide space 33 enables me to adjust the guard rail 5 into position upon the yoke 17 without the well known outwardly flaring ends of the guard rail interfering with cross-ties and other parts of the railroad structure.

I have shown one position of the guard rail 5 during the insertion thereof, in Fig. 3 of the drawings.

I claim:

1. The combination of a main rail; a guard rail adjacent thereto; a pair of filler blocks adjustably engaged with each other between the rails and holding said rails in spaced relation to each other, one block being provided with spaced openings and the other block being provided with correspondingly spaced teeth projecting into said openings, the block provided with the openings having a hollow interior communicating with said openings; and means for clamping said rails and said blocks together.

2. The combination of a main rail; a guard rail adjacent thereto; a yoke embracing said rails; means interposed between said rails and holding them in spaced relation to each other, said means including a filler block having permanent stop parts embracing said yoke and a frangible stop part between one of said permanent stop parts and said yoke; and a clamping wedge interposed between said yoke and one of said rails.

3. The combination of a main rail; a guard rail adjacent thereto; a yoke embracing said rails; means interposed between said rails and holding them in spaced relation to each other, said means including a filler block having frangible parts projecting therefrom and embracing said yoke, said block having stop parts projecting therefrom stronger than said frangible parts and embracing said yoke, the distance between said stop parts being greater than the distance between said frangible parts; and a clamping wedge interposed between said yoke and one of said rails.

4. The combination of a main rail; a guard rail adjacent thereto; a yoke embracing said rails; means interposed between said rails and holding them in spaced relation to each other, said means including a filler block having a pair of flanges projecting therefrom in spaced relation to each other, said flanges embracing said yoke and extending substantially at right angles thereto, the inner portions of said flanges adjacent said yoke being thin and frangible and the outer portions of said flanges being thicker and stronger than said frangible portions and forming stops to prevent displacement of said block; and a clamping wedge interposed between said yoke and one of said rails.

5. The combination of a main rail; a guard rail adjacent thereto; a cross tie supporting said rails; means interposed between said rails and holding them in spaced relation to each other; a yoke embracing said rails; a clamping wedge interposed between one end of said yoke and one of said rails, said wedge having a part extending over the base of one of said rails and having a notched portion exposing the top of the underlying rail base; and means engaging the top of said base and securing it to said tie, said means being in position to engage the notched portion of said part and prevent outward movement of said wedge.

6. A guard rail clamp yoke comprising a body portion and end portions overhanging the body portion in spaced relation thereto, one of said overhanging end portions having a rail-base engaging shoulder formed on its under side and providing a wider space between the end portion and the body portion inwardly of the shoulder than the space between the end portion and body portion outwardly of the shoulder, substantially as and for the purpose described.

7. The combination of a main rail; a guard rail adjacent thereto; a cross tie supporting said rails; a yoke extending below the plane of the top of the tie and embracing said rails and having a projection overlapping said cross tie; and means for clamping said rails and yoke together.

In testimony whereof I affix my signature in presence of two witnesses.

DAVID F. VAUGHAN.

Witnesses:
S. I. HARPER,
A. V. GROUPE.